United States Patent
Hu et al.

(10) Patent No.: US 9,120,171 B2
(45) Date of Patent: Sep. 1, 2015

(54) AUTOMATIC TIN-ADDING MACHINE

(71) Applicant: Wistron Corp., New Taipei (TW)

(72) Inventors: Sam Hu, New Taipei (TW); Xiao-Hua Zeng, New Taipei (TW); Chiu-Lin Lai, New Taipei (TW); Bj Su, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 14/321,915

(22) Filed: Jul. 2, 2014

(65) Prior Publication Data

US 2015/0190874 A1 Jul. 9, 2015

(30) Foreign Application Priority Data

Jan. 8, 2014 (CN) .......................... 2014 2 0011948

(51) Int. Cl.
 B23K 37/00 (2006.01)
 B23K 3/06 (2006.01)
 B65G 49/00 (2006.01)

(52) U.S. Cl.
 CPC .............. B23K 3/0646 (2013.01); B65G 49/00 (2013.01)

(58) Field of Classification Search
 None
 See application file for complete search history.

(56) References Cited

U.S. PATENT DOCUMENTS

| | | | | |
|---|---|---|---|---|
| 1,725,960 A | * | 8/1929 | Jones | 228/8 |
| 3,684,151 A | * | 8/1972 | Burman et al. | 228/19 |
| 4,563,974 A | * | 1/1986 | Price | 118/66 |
| 5,948,312 A | * | 9/1999 | Gates | 222/590 |
| 2002/0000460 A1 | * | 1/2002 | Suetsugu et al. | 228/103 |
| 2002/0038814 A1 | * | 4/2002 | Mimura et al. | 228/256 |
| 2004/0011851 A1 | * | 1/2004 | Howell et al. | 228/37 |
| 2005/0109823 A1 | * | 5/2005 | Gruber et al. | 228/246 |
| 2009/0236402 A1 | * | 9/2009 | Willenegger et al. | 228/45 |
| 2010/0163600 A1 | * | 7/2010 | Sato et al. | 228/101 |
| 2012/0292376 A1 | * | 11/2012 | Mamber et al. | 228/104 |

FOREIGN PATENT DOCUMENTS

| | | | | | |
|---|---|---|---|---|---|
| CN | 202021910 U | | 11/2011 | | |
| CN | 102554393 A | * | 7/2012 | | |
| CN | 103010645 A | * | 4/2013 | | |
| CN | 203018879 U | | 6/2013 | | |
| CN | 203021426 U | * | 6/2013 | | |
| CN | 203409395 U | * | 1/2014 | | |
| CN | 203448812 U | * | 2/2014 | | |
| DE | 102008050328 A1 | * | 4/2010 | | G01F 23/22 |
| DE | 102011077247 A1 | * | 12/2012 | | |
| JP | 02084266 A | * | 3/1990 | | B23K 3/06 |
| TW | 576616 U | | 2/2004 | | |
| TW | M275671 U | | 9/2005 | | |

* cited by examiner

Primary Examiner — Kiley Stoner

(74) Attorney, Agent, or Firm — Maschoff Brennan

(57) ABSTRACT

An automatic tin-adding machine for adding a plurality of tin rods to a molten tin tank comprises a base, two transmission shafts, at least one first flexible transmission member, a plurality of tin rod carrying members, a tin stock detector, a drive and a circuit control system. The base has a tin rod adding opening corresponding to the molten tin tank. The two transmission shafts are pivoted on the base side by side. The at least one first flexible transmission member is sleeved on the two transmission shafts. The tin rod carrying members are fixed to the first flexible transmission member and configured to carry the tin rods. The tin stock detector is configured to detect the stock of tin liquid in the molten tin tank. The drive is connected to one of the transmission shafts. The circuit control system comprises a circuit control unit.

12 Claims, 5 Drawing Sheets

AUTOMATIC TIN-ADDING MACHINE

CROSS-REFERENCE TO RELATED APPLICATIONS

This non-provisional application claims priority under 35 U.S.C. §119(a) on Patent Application No(s). 201420011948.2 filed in China, P.R.C. on 2014 Jan. 8, the entire contents of which are hereby incorporated by reference.

TECHNICAL FIELD

The disclosure relates to a tin-adding machine, more particularly to an automatic tin-adding machine.

BACKGROUND

Tin soldering machines are used to solder the electronic components to the circuit board. The tin soldering machine usually equips with molten tin tank for melting tin into tin liquid for the soldering processes. The volume of the tin liquid in the molten tin tank decreases as the tin soldering machine being used. Hence, to ensure there is enough tin liquid in the molten tin tank for soldering, the people (operators) have to pay attention to the volume of the tin liquid and add tin material to the molten tin tank when the tin liquid is insufficient.

Since manually adding materials is unable to respond the decrease of the volume of the tin liquid immediately, so sometimes the operators may need to add a large amount of tin rods at a time simply because they found it too late. This leads to the problem of significantly temperature decrease. Specifically, each tin rod is about 1 kilogram in weight and adding one of them results in a temperature drop of 0.7 to 1 degree Celsius. Thus, adding lots of tin rods will leads to a considerable temperature decrease and the tin liquid will be partially solidified, thereby negatively affecting the quality of dip coating regarding the electronic components and the circuit board.

One way to avoid this problem is to replace the tin rods by tin wires. Adding the tin wires continuously can avoid the problem of sudden temperature drop mentioned before, but it requires extra equipments and manpower to turn the tin rods into the tin wires. In other words, this increases the costs considerably. Therefore, it is important to provide a tin-adding machine which is capable of adding tin rods automatically based on the stock of the tin liquid in the molten tin tank, in order to avoid the problem of large temperature fluctuation.

SUMMARY

An automatic tin-adding machine for adding a plurality of tin rods to a molten tin tank comprises a base, two transmission shafts, at least one first flexible transmission member, a plurality of tin rod carrying members, a tin stock detector, a drive and a circuit control system. The base has a tin rod adding opening corresponding to the molten tin tank. The two transmission shafts are pivoted on the base side by side. The at least one first flexible transmission member is sleeved on the two transmission shafts. The tin rod carrying members are fixed to the first flexible transmission member and configured to carry the tin rods. The tin stock detector is configured to detect the stock of tin liquid in the molten tin tank. The drive is connected to one of the transmission shafts. The circuit control system comprises a circuit control unit. The circuit control unit is electrically connected to the tin stock detector and the drive. When the tin stock detector detects that the stock of tin liquid in the molten tin tank is less than a predetermined stock, the circuit control unit control the drive to drive one of the transmission shafts to rotate for driving the tin rod carrying members move relative to the base along a transmission path to pass over the tin rod adding opening, so that at least one of the tin rods falls from the tin rod adding opening to the molten tin tank.

BRIEF DESCRIPTION OF THE DRAWINGS

The present disclosure will become more fully understood from the detailed description and the drawings given herein below for illustration only, and thus does not limit the present disclosure, wherein.

DETAILED DESCRIPTION

Figure 1:
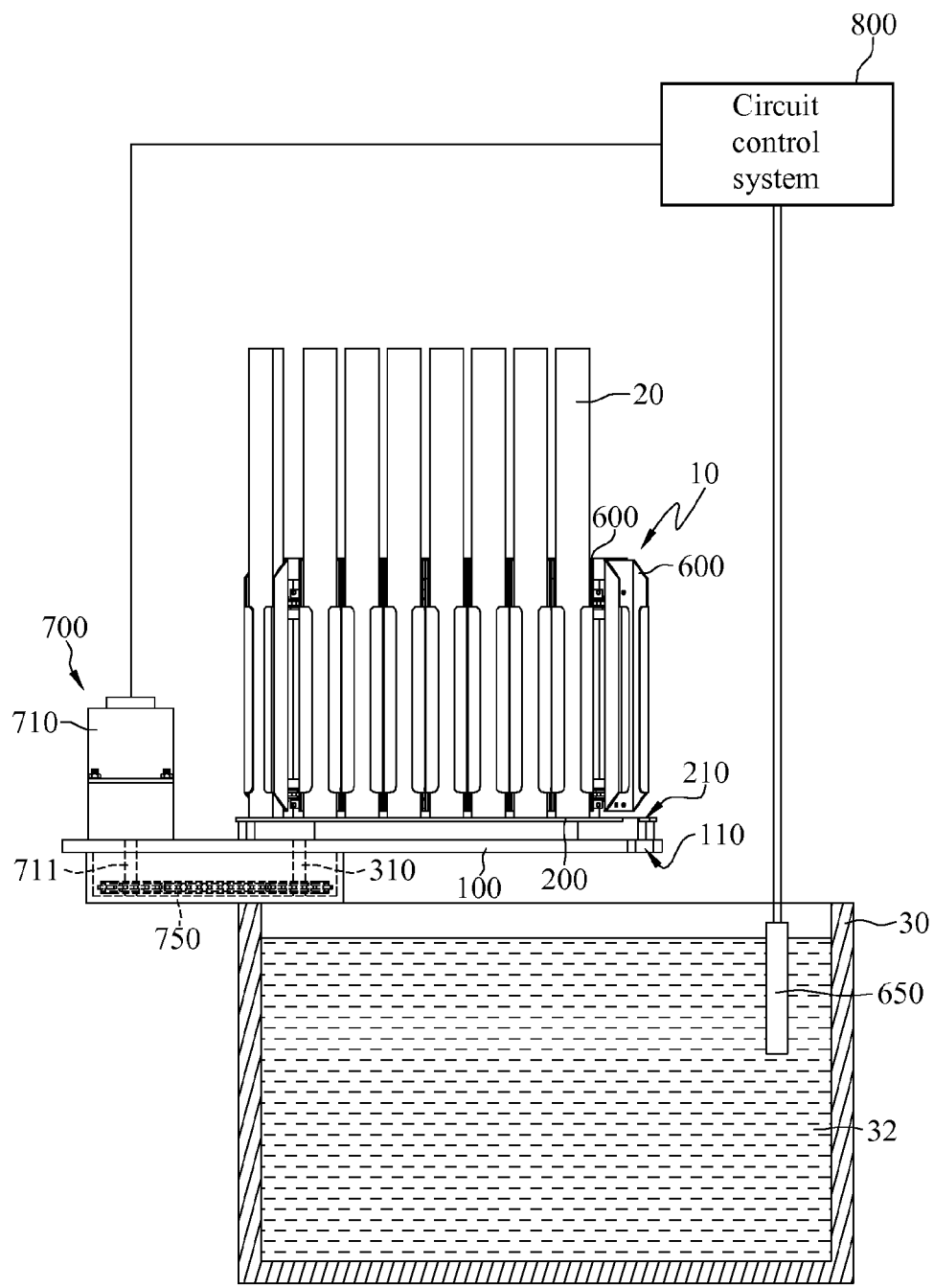
FIG. 1 is a partially sectional view of an automatic tin-adding machine and a molten tin tank according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
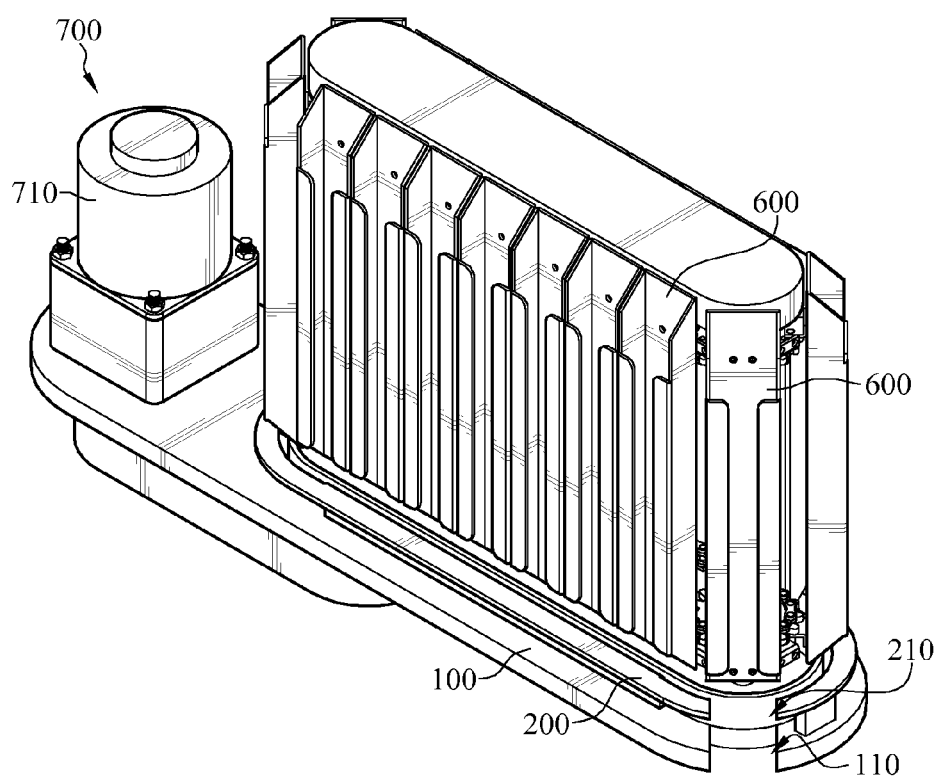
FIG. 2 is a perspective view of the automatic tin-adding machine of FIG. 1.
Figure 3:
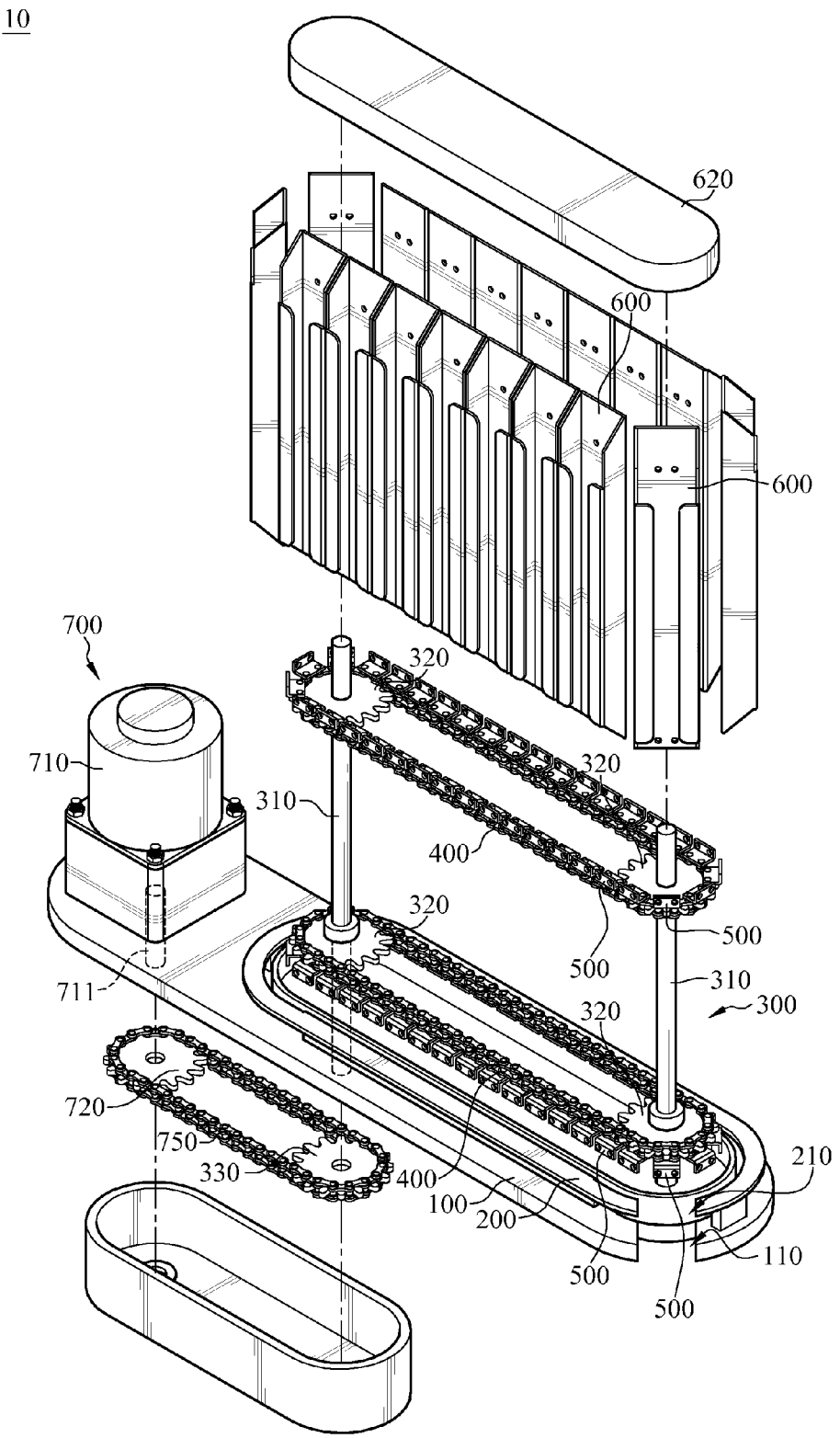
FIG. 3 is an exploded view of FIG. 2.

FIG. 1 is a partially sectional view of an automatic tin-adding machine and a molten tin tank according to a first embodiment of the disclosure; FIG. 2 is a perspective view of the automatic tin-adding machine of FIG. 1; FIG. 3 is an exploded view of FIG. 2. As seen in FIG. 1 to FIG. 3, the automatic tin-adding machine 10 of this embodiment is configured to add a tin rod 20 to a molten tin tank 30. The molten tin tank 30 is configured to melt the tin rod 20 into the tin liquid 32 for a tin stove to use.

The automatic tin-adding machine 10 comprises a base 100, a tin rod support plate 200, two transmission shafts 300, two first flexible transmission members 400, a plurality of installation members 500, a plurality of tin rod carrying members 600, a top plate 620, a tin stock detector 650, a drive 700, a second flexible transmission member 750 and a circuit control system 800.

The base 100 has a tin rod adding opening 110 corresponding to the molten tin tank 30.

The tin rod support plate 200 is disposed on the top of the base 100 and has a spout 210 corresponding to the tin rod adding opening 110.

The transmission shafts 300 are pivoted on the base 100 side by side. Each of the transmission shafts 300 comprises a shaft 310 and two first transmission chainrings 320. The two first transmission chainrings 320 are fixed to the shaft 310. One of the transmission shafts 300 further comprises a second transmission chainring 330 fixed to the shaft 310. The two shafts 310 are above the base 100 while the second transmission chainring 330 is below the base 100.

The first flexible transmission member 400 is a chain, for example. One of the first flexible transmission members 400 engages with the two first transmission chainrings 320 above the two transmission shafts 300 while the other first flexible transmission member 400 engages with the two first transmission chainrings 320 below the two transmission shafts 300. These the first transmission chainrings 320 are able to drive the two first flexible transmission members 400 to rotate clockwise or counterclockwise for forming a transmission path.

In this embodiment, the number of the first transmission chainrings 320 on the first flexible transmission member 400 and the number of the transmission shafts 300 are both two, but it is not limited thereto. In other embodiments, the number of the first transmission chainring 320 on the first flexible transmission member 400 and that of the transmission shaft 300 may both be one.

The installation members 500 are fixed to the two first flexible transmission members 400 respectively.

The tin rod carrying members 600 are fixed to the installation members 500 to make the tin rod carrying members 600 rotate around the transmission path of the first flexible transmission member 400. The tin rod carrying members 600 is configured to carry the tin rod 20. The tin rod support plate 200 is located between the base 100 and the tin rod carrying members 600 and the area outside the spout 210 of the tin rod support plate 200 is for supporting the tin rod 20 carried by the tin rod carrying members 600. When the tin rod carrying member 600 moves relative to the base 100 along the transmission path and pass through the top of the tin rod adding opening 110 and the spout 210, at least one tin rod 20 drops from the tin rod adding opening 110 and the spout 210 into the molten tin tank 30.

The top plate 620 is installed on one end of the two transmission shafts 300 away from the base 100 for strengthening the structure of the automatic tin-adding machine 10.

The tin stock detector 650 is configured to detect the stock of the tin liquid 32 in the molten tin tank 30. Specifically, the tin stock detector 650 and the tin liquid 32 are both conductors so a close circuit is formed when the tin liquid 32 touching the tin stock detector 650 indicates the stock of the tin liquid 32 is sufficient. By comparison, when the tin liquid 32 is below 540, a completed circuit cannot be formed (in other words, an open circuit) because the tin liquid 32 does not touch the tin stock detector 650. As a result, it is known that the stock of the tin liquid 32 is not enough.

The drive 700 is connected to one of the transmission shafts 300. In this embodiment, the drive 700 comprises a driving motor 710 and a driving chainring 720. The driving motor 710 has a driving axle 711. The driving chainring 720 is fixed to the driving axle 711 and is below the base 100. The second flexible transmission member 750 engages with the driving chainring 720 and the second transmission chainring 330 for making the driving motor 710 drive the two transmission shafts 300 to rotate.

Figure 4:
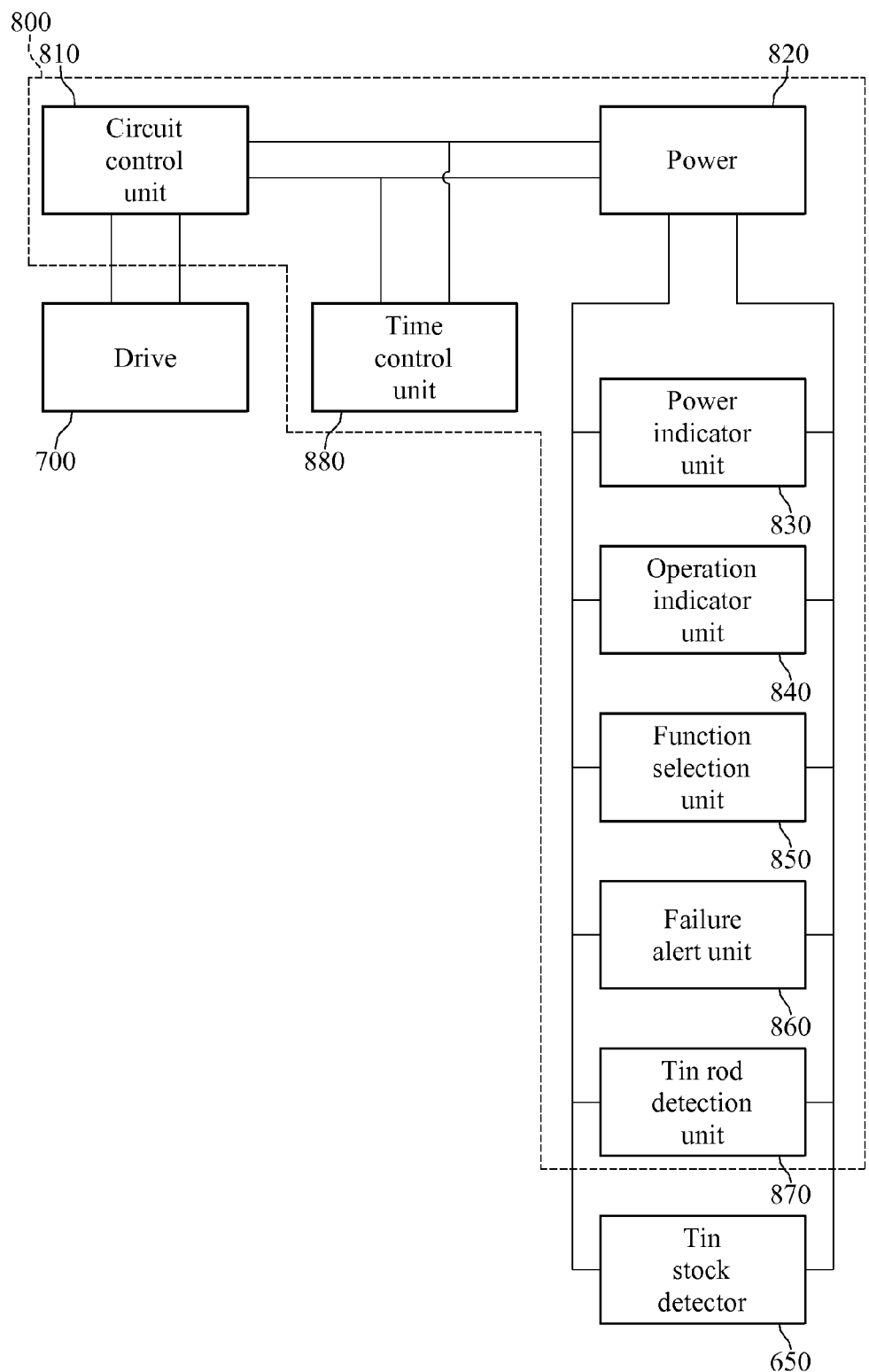
FIG. 4 is a block diagram of the circuit control system of the automatic tin-adding machine of FIG. 1.

FIG. 4 is a block diagram of the circuit control system of the automatic tin-adding machine of FIG. 1. As seen in FIG. 4, the circuit control system 800 comprises a circuit control unit 810 electrically connected to the tin stock detector 650 and the drive 700. When the tin stock detector 650 detects that the stock of the tin liquid 32 in the molten tin tank 30 is less than a predetermined stock, the circuit control unit 810 controls the drive 700 to drive the two transmission shafts 300 to rotate. Thereby, the tin rod carrying member 600 is driven to move relative to the base 100 along the transmission path and passes through the top of the tin rod adding opening 110, so that at least one tin rod 20 drops from the tin rod adding opening 110 to the molten tin tank 30.

The circuit control system 800 further comprises a power 820, a power indicator unit 830, an operation indicator unit 840, a function selection unit 850, a tin rod indicator unit 870, a failure alert unit 860 and a time control unit 880. The power 820, the power indicator unit 830, the operation indicator unit 840, the function selection unit 850, the tin rod indicator unit 870, the failure alert unit 860 and the time control unit 880 are all electrically connected to the circuit control unit 810.

The power 820 is configured for provide power required to the automatic tin-adding machine 10 for operation.

The power indicator unit 830 is configured to show the power state of the automatic tin-adding machine 10, such as the indications of normal power supply or no power supply.

The operation indicator unit 840 is configured to show the operation state of the automatic tin-adding machine 10, such as "working" or "downtime".

The function selection unit 850 has an automatic mode and an enforcing mode. When the automatic tin-adding machine 10 is in the automatic mode, the circuit controls unit 810 controls the operation of the drive 700 based on the signal from the tin stock detector 650. In contrast, when the automatic tin-adding machine 10 is in the enforcing mode, the circuit control unit 810 controls and forces the drive 700 to operate.

The tin rod indicator unit 870 is configured to detect the stock state of the tin rod carrying members 600.

The failure alert unit 860 is configured to show the abnormal state of the automatic tin-adding machine 10. For instance, when the tin rod indicator unit 870 detects that the stock of the tin rod carrying members 600 is not enough, the failure alert unit 860 will remind the operators to resupply it with the tin rod 20.

The time control unit 880 is a time relay, for example. The time control unit 880 is configured to control the operating frequency of the drive 700 to be at least greater than a predetermined value. For instance, when the predetermined value of the operating frequency is one time every three minutes, another tin will be added after another three minutes, controlled by the time control unit 880. Specifically, when the tin rod 20 just has been added to the molten tin tank 30, the tin rod 20 is not melted completely so the height of tin liquid level (hereinafter, tin liquid height) is not stable. Thus, the tin stock detector 650 may be misled by the temporary tin liquid height and adds too much the tin rod 20. However, by the aforementioned approach of time delay, the tin rod 20 will not be added even if the tin stock detector 650 detects that the tin liquid 32 in the molten tin tank 30 is not sufficient.

Figure 5:
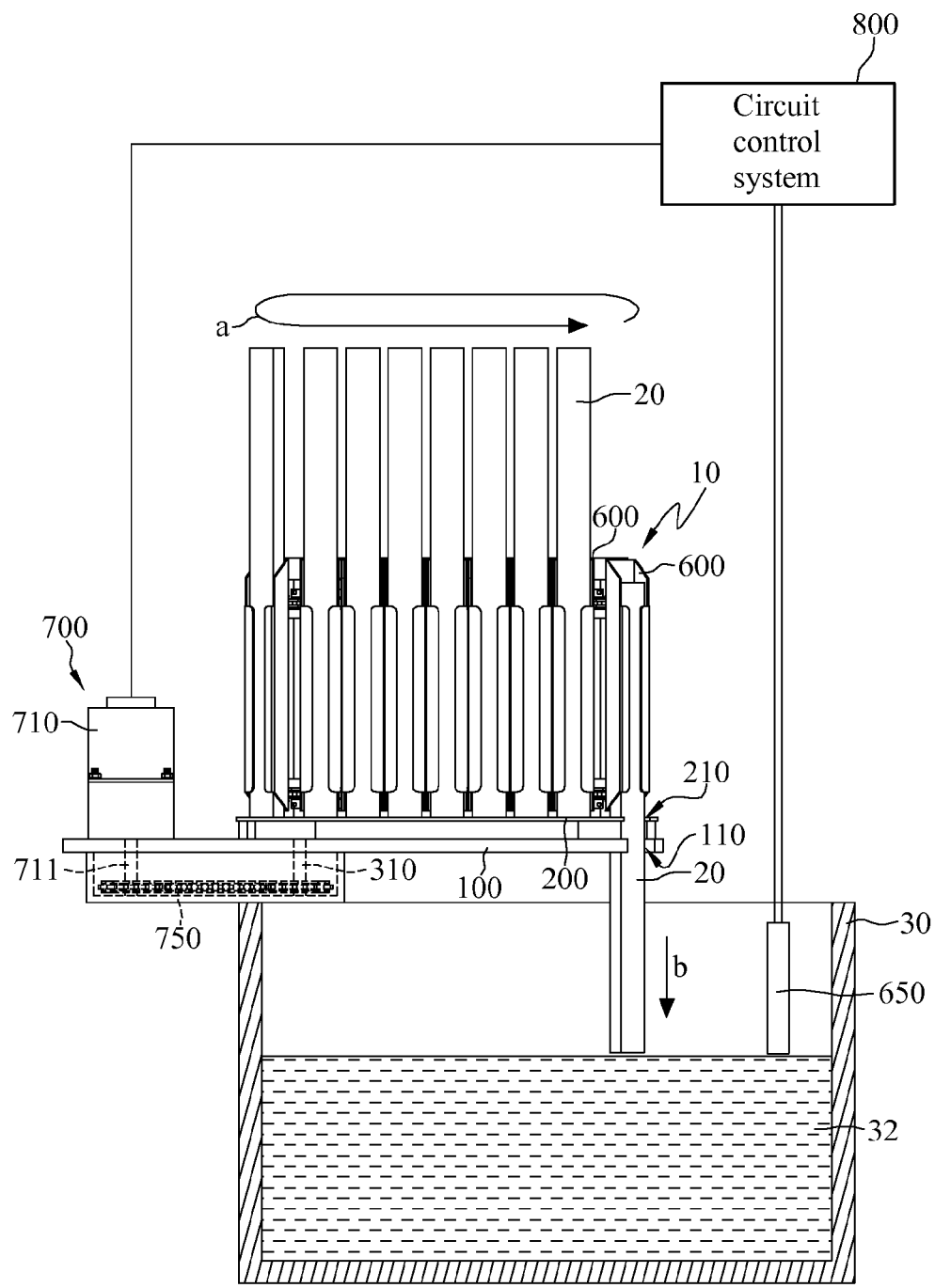
FIG. 5 is schematic view of the automatic tin-adding machine of FIG. 1 during tin-adding processes.

FIG. 5 is schematic view of the automatic tin-adding machine of FIG. 1 during tin-adding process. As seen in FIG. 5, when the tin liquid height in the molten tin tank 30 is below the lower edge of the tin stock detector 650 and therefore is separated from it, the tin stock detector 650 and the tin liquid 32 are not electrically connected to each other (namely an open circuit), thereby making the tin stock detector 650 determine that the tin liquid 32 in the molten tin tank 30 is not enough. Then, when the tin stock detector 650 detects that the tin liquid 32 in the molten tin tank 30 is not enough, the circuit control system 800 controls the drive 700 to operate in order to drive the tin rod carrying members 600 to move relative to the base 100 along the transmission path (namely the direction of arrow a). The tin rod carrying members 600, then, pass through the top of the tin rod adding opening 110 and the spout 210 so that at least one of the tin rod 20 drops from the tin rod adding opening 110 into the molten tin tank 30 (along the direction of arrow b). Thereby, the fluctuation of the tin liquid height in the molten tin tank 30 and the temperature of the tin liquid 32 may be reduced.

Specifically, the conditions of open circuit and close circuit are used to determine whether the stock of the tin liquid 32 is enough or not, but the disclosure is not limited thereto. In other embodiments, it can be done by detecting the liquid level.

The summary of the differences between using the automatic tin-adding machine 10 and manually adding tin is as follows:

| items | | manually adding tin | using the automatic tin-adding machine 10 |
|---|---|---|---|
| samples (in number) | | 12692 | 11327 |
| defect number | short circuit | 254 | 83 |
| | missing solder | 375 | 212 |
| | insufficient tin | 83 | 6 |
| defect rate (in percentage) | | 6% | 3% |

Based on information of the detect rate, the detect rate is 6% when not using the automatic tin-adding machine 10, but it is reduced to 3% when using the automatic tin-adding machine 10. That is, using the automatic tin-adding machine 10 may improve the quality by about the base 100%.

Additionally, since the fluctuation of the liquid level of the tin liquid 32, the tin dross generation rate is further reduced. The information is summarized as follows:

| items | manually adding tin | using the automatic tin-adding machine 10 |
|---|---|---|
| capacity | 17181 | 14310 |
| tin dross (in kilograms) | 12 | 7 |
| amount of tin added (in kilograms) | 98 | 80 |
| tin dross generation rate (in percentage) | 12% | 9% |
| tin dross (in kilograms) | 0.68 | 0.52 |

As seen in the table, the tin dross generation rate is 12% of the molten tin tank 30 when not using the automatic tin-adding machine 10. By comparison, it reduced to 9% when the automatic tin-adding machine 10 is utilized. That is, the tin dross generation rate is reduced by 25% and the tin dross in weight is reduced by 0.16 kilogram.

In the automatic tin-adding machine according to the disclosure, when the tin stock detector detects that the tin liquid in the molten tin tank is insufficient, the automatic tin-adding machine will add tin immediately. Thereby, the fluctuation of the tin liquid level in the molten tin tank and the fluctuation of the temperature of the tin liquid are both reduced, thereby improving the quality of soldering.

Moreover, the reduced fluctuation of the tin liquid level can further reduce the tin dross generation rate.

What is claimed is:

1. An automatic tin-adding machine for adding a plurality of tin rods to a molten tin tank, comprising:
a base having a tin rod adding opening corresponding to the molten tin tank;
two transmission shafts pivoted on the base side by side;
at least one first flexible transmission member sleeved on the two transmission shafts;
a plurality of tin rod carrying members fixed to the first flexible transmission member and configured to carry the tin rods;
a tin stock detector configured to detect the stock of tin liquid in the molten tin tank;
a drive connected to one of the transmission shafts; and
a circuit control system comprising a circuit control unit electrically connected to the tin stock detector and the drive, wherein when the tin stock detector detects that the stock of tin liquid in the molten tin tank is less than a predetermined stock, the circuit control unit control the drive to drive one of the transmission shafts to rotate for driving the tin rod carrying members move relative to the base along a transmission path to pass over the tin rod adding opening, so that at least one of the tin rods falls from the tin rod adding opening to the molten tin tank.

2. The automatic tin-adding machine according to claim 1, further comprising a tin rod support plate between the base and the tin rod carrying member, wherein the tin rod support plate has a spout corresponding to the tin rod adding opening.

3. The automatic tin-adding machine according to claim 1, wherein each of the two transmission shafts comprises a axle and at least one first transmission chainring, the first transmission chainring is fixed to the axle while the first flexible transmission member engages with the two first transmission chainrings.

4. The automatic tin-adding machine according to claim 3, further comprising a plurality of installation members fixed to the first flexible transmission member, wherein the tin rod carrying member is fixed to the installation member.

5. The automatic tin-adding machine according to claim 3, wherein the number of at least one first transmission chainrings is two, the number of the at least one first flexible transmission members is two, the opposite two ends of the tin rod carrying member are fixed to the two first flexible transmission members respectively.

6. The automatic tin-adding machine according to claim 3, further comprising a second flexible transmission member, wherein one of the transmission shafts further comprises a second transmission chainring fixed to the axle, the drive comprises a driving motor and a driving chainring, the driving motor has a driving shaft, the driving chainring is fixed to the driving shaft, the second flexible transmission member engages with the driving chainring and the second transmission chainring for making the driving motor drive the two driving shafts to rotate.

7. The automatic tin-adding machine according to claim 1, further comprising a top plate installed on one end of the two transmission shafts away from the base.

8. The automatic tin-adding machine according to claim 1, wherein the circuit control system further comprises a power indicator unit and an operation indicator unit, the power indicator unit is configured to show the power state of the automatic tin-adding machine, and the operation indicator unit is configured to show the operation state of the automatic tin-adding machine.

9. The automatic tin-adding machine according to claim 1, wherein the circuit control system further comprises a function selection unit having an automatic mode and a enforcing mode, when the automatic tin-adding machine is in the automatic mode, the circuit control unit controls the operation of the drive based on the signal of the tin stock detector, and when the automatic tin-adding machine is in the enforcing mode, the circuit control unit controls and forces the drive to operate.

10. The automatic tin-adding machine according to claim 1, wherein the circuit control system further comprises a tin rod detection unit configured to detect the stock of the tin rod carrying members.

11. The automatic tin-adding machine according to claim 1, wherein the circuit control system further comprises a failure alert unit configured to show the abnormal state of the automatic tin-adding machine.

12. The automatic tin-adding machine according to claim 1, wherein the circuit control system further comprises a time control unit configured to control the operation frequency of the drive to be greater than a predetermined value.

* * * * *